United States Patent [19]

Philippides et al.

[11] 4,395,773

[45] Jul. 26, 1983

[54] APPARATUS FOR IDENTIFYING CODED INFORMATION WITHOUT INTERNAL CLOCK SYNCHRONIZATION

[75] Inventors: Constantinos Philippides; William H. Zinger, both of Columbia, Md.

[73] Assignee: The United States of America as represented by the Secretary of the Navy, Washington, D.C.

[21] Appl. No.: 267,122

[22] Filed: May 26, 1981

[51] Int. Cl.³ .................................................. H04L 7/08
[52] U.S. Cl. .................................... 375/116; 307/269; 371/6; 382/41
[58] Field of Search .................. 375/112, 114, 116; 371/6, 42, 47; 307/269, 480, 221 R; 328/63, 72, 108, 109, 110; 360/51; 329/122, 123; 340/146.2, 147.5 Y

[56] References Cited

U.S. PATENT DOCUMENTS

| | | | |
|---|---|---|---|
| 3,317,669 | 5/1967 | Ohnsorge | 375/116 |
| 3,591,720 | 10/1969 | Othmer | 370/106 |
| 3,609,391 | 6/1969 | Hatano | 307/480 |
| 3,760,355 | 9/1973 | Bruckert | 340/146.3 WD |
| 3,909,724 | 9/1975 | Spoth et al. | 375/116 |
| 4,124,898 | 11/1978 | Munter | 307/269 |
| 4,185,273 | 1/1980 | Gowan | 360/51 |
| 4,242,755 | 12/1980 | Gauzan | 375/116 |
| 4,293,949 | 10/1981 | Philippides | 371/6 |

*Primary Examiner*—Benedict V. Safourek
*Assistant Examiner*—Stephen Chin
*Attorney, Agent, or Firm*—Robert F. Beers; Thomas M. Phillips

[57] ABSTRACT

A self-synchronized apparatus for recognizing identifying codes especially on missiles and spacecraft. The apparatus comprises a video quantizer for receiving bipolar video input signals and providing an output of validly timed data to a decode register which is clocked by a free running oscillator. The decode register defines a valid mark as "K" high bits followed by "K" low bits where 2K is the capacity of the decode register. A constant width decoder compares the first K bits in a sequential, pairwise fashion with the inverse of the values of the second K bits. The constant width decoder ANDs the pairwise comparison outputs to insure that "K" high bits are followed by "K" low bits before a "mark" signal is produced. A derivative data buffer receives the "mark" signals. A synchronous counter is coupled to the derivative buffer and the free running oscillator to produce one output pulse for every N oscillator output pulses. The inputs of the derivative buffer presets the sync counter to synchronize the derivative clock output with the actual data as transmitted.

8 Claims, 2 Drawing Figures

APPARATUS FOR IDENTIFYING CODED INFORMATION WITHOUT INTERNAL CLOCK SYNCHRONIZATION

BACKGROUND OF THE INVENTION

This invention relates to circuitry which detects, decodes, and synchronizes incoming data which first identifies the spacecraft for which the data is intended from a set of spacecraft and then provides command data or the like to the identified spacecraft.

There are many applications wherein it is necessary to recognize a predetermined identifying code. Systems requiring recognition of predetermined signal patterns include selective calling communications systems and synchronized data transfer systems. Several pattern recognition techniques are known. One such system is the one disclosed in copending application Ser. No. 89,672 filed Oct. 30, 1979. That system derives a clock pulse whenever a valid data signal is received in mark-and-space format (the absence of marks are considered spaces). Also, that system utilizes a threshold detector which examines a mark-and-space encoded analog waveform which generates two pulse sequences, one corresponding to time periods where the waveform exceeds a positive threshold in a positive fashion and another to those time periods where a negative threshold is exceeded in the negative direction. By measuring the interim of time between each negative threshold pulse and positive threshold pulse, where there is no positive threshold pulse in between, a determination can be made if the original waveform actually transmitted a valid mark waveform. This is a first safeguard to assure that only vaid data is clocked to subsequent data processing equipment. A second safeguard provides for a disection of the coincidence pulse by sampling it at a rate much higher than the frequency of the waveform transmitted. By properly gating the samples, the detected marks and spaces can be used in generating corresponding clocks.

SUMMARY OF THE INVENTION

The present invention provides a self-synchronized apparatus for recognizing identifying codes. The apparatus comprises a video quantizer for receiving bipolar video input signals and providing an output of validity timed data to a decode register which is clocked by free running oscillator. The decode register defines a valid mark as "K" high bits folloed by "K" low bits where 2 K is the capacity of the decode register. A constant width decoder compares the first K bits in a sequential, pairwise fashion with the inverse of the values of the second K bits. The constant width decoder ANDs the pairwise comparison outputs to insure that "K" high bits are followed by "K" low bits before a "mark" signal is produced. A derivative data buffer receives the "mark" signals. A synchronous counter is coupled to the derivative buffer and the free running oscillator to produce one output pulse for every N oscillator output pulses. The inputs of the derivative buffer presets the sync counter to synchronize the derivative clock output with the actual data as transmitted.

Accordingly, an object of the invention is to provide apparatus for missile identification and message detection by analyzing received signals to determine if an identification code is present.

Another object of the invention is to provide apparatus for missile identification and message detection by analyzing input signals to determine if an identification code is present independent of or invarient with respect to the relative timing between the internal clocking generated by a local oscillator and the received signals.

A further object of the invention is the provision of apparatus for identifying missile codes with automatic internal clock synchronization to that of the message originator, thus eliminating transmitter instabilities and various types of noise and jitter, depending on knowledge of message propagation time between point of origin and missile, dependency on knowledge of missile motion induced doppler shift of signal carrier, and dependency on special fixed synchronization codes or procedures.

Still another object of the invention is the provision of apparatus for identifying missile codes with automatic internal clock synchronization to the data source which is versatile to the extent that it can process from the video input, an unlimited number of "space" bits in a mark-space-code over a range of sample rates and bit widths.

Other objects, advantages and novel features of the invention will become apparent from the following detailed description of the invention when considered in conjunction with the accompanying drawings wherein.

Figure 1:
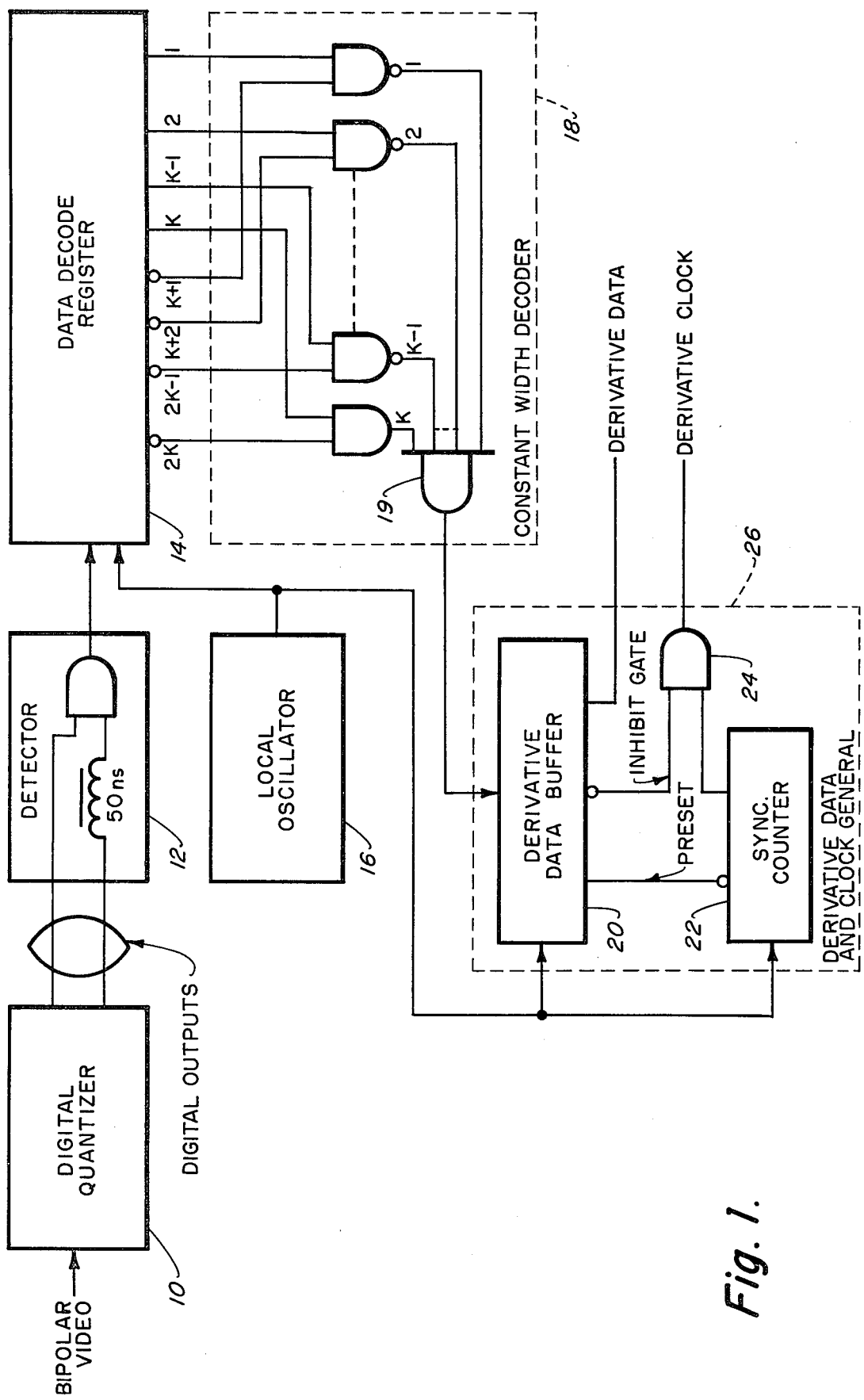
FIG. 1 is a block diagram of a preferred embodiment of the invention.
Figure 2:
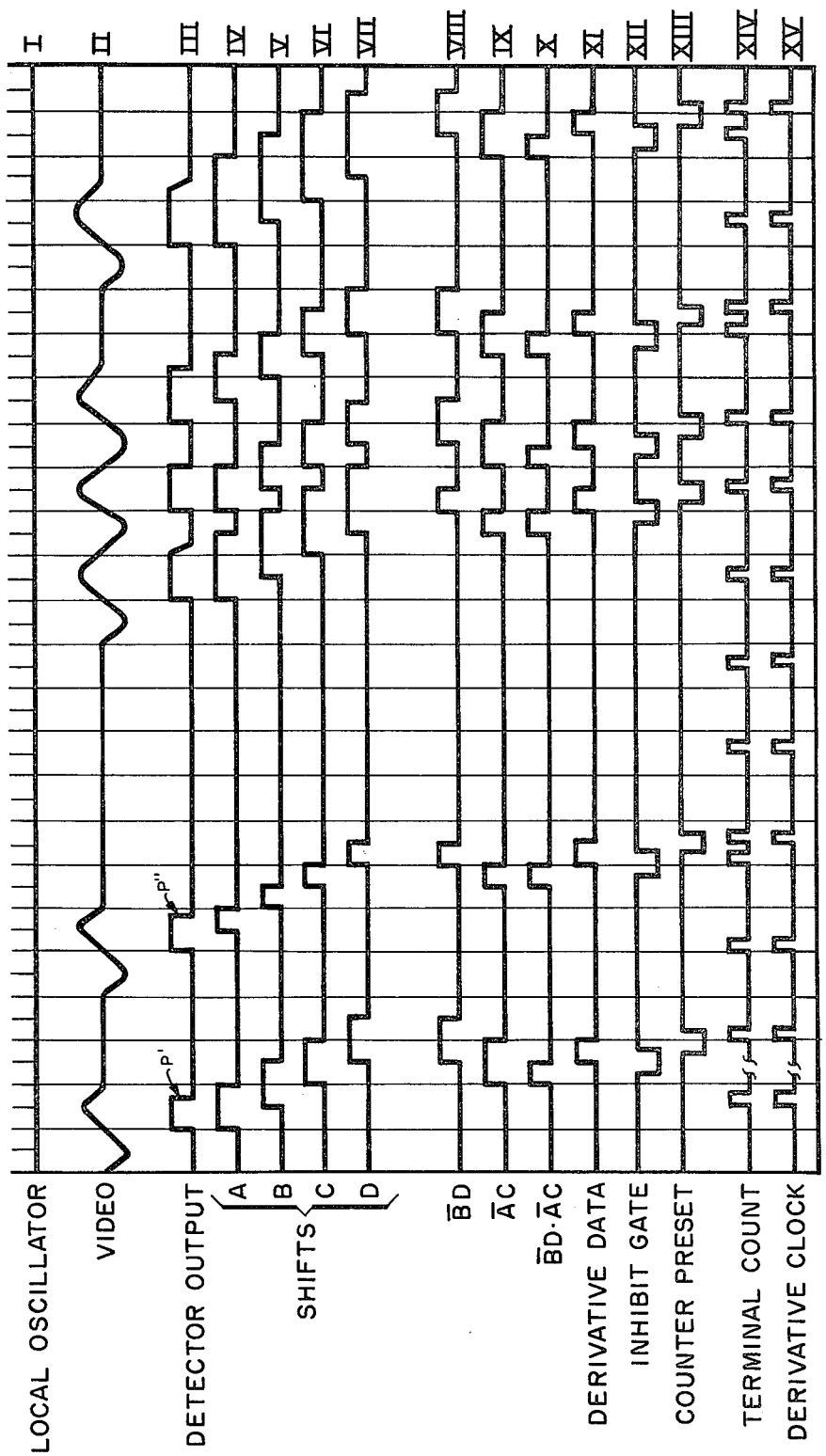
FIG. 2 is a timing diagram showing how the embodiment of FIG. 1 generates derivative data and derivative clocks.

Referring now to the drawings wherein there is shown in FIGS. 1 and 2 a bipolar video signal (waveform II, FIG. 2) fed to a digital quantizer 10 where it is converted into pulsed digital outputs (waveform III) which correspond to "marks" in a mark-space code. As shown in FIG. 2 "marks" occur where a preset threshold is exceeded.

The digital output of quantizer 10 is fed to detector 12 where the spacing of consecutive "mark" pulses is measured to determine if input spacing conform to valid (in time) data patterns. By way of example, in the embodiment shown, the spacing between marks is set at 50 nsec.

The validly timed data from detector 12 is fed to a data decode register 14 which is clocked by a free-running local oscillator 16. A valid mark is defined in register 14 as "K" high bits followed by "K" low bits where 2K is the number of bits in the register 14 and represents the number of clocks generated by the local oscillator 16 during a "mark" period or cycle. The first K bits are compared in sequential, pairwise fashion with the inverse values of the second K bits in the AND gates of constant width decoder 18. The pairwise comparison outputs are ANDed in AND gate 19 to assure that K high bits are followed by K "low" bits before a "mark" signal is produced. The presence of a "mark" results in an output signal from AND gate 19 of constant width decoder 18 that is fed to data buffer 20. The purpose of data buffer 20 is to sort out and sequence the "mark" signal data.

Simultaneously, a sync counter 22 produces one pulse output for every N clock inputs from local oscillator 16. The output of sync counter 22 provides a stream of pulses to AND gate 24 the output of which is the derivative clock. Sync counter 22 is also controlled by a preset pulse that comes from data buffer 20. Whenever there is a mark signal fed to data buffer 20, a preset signal is fed to sync counter 22 to preset it thereby resynchronizing the derivative clock output from gate 24 with the mark signal or actual transmitted data from AND gate 19.

The purpose of inhibit gate 24 is to prevent clocking from sync counter 22 while data is being entered into data buffer 20. Data buffer 20, sync counter 22, and inhibit gate 24 combine to form the derivative data and clock generator 26.

Referring to the timing diagram of FIG. 2 which shows the video signal in line II which is transformed into mark and space outputs as shown in line III. Due to phase shifting, video changes, and transition time differences, the pulse duration of detected marks may vary slightly. To correct for this introduced uncertainty, clocks from local oscillator 16 shown in line I are gated with the mark signals of line III, thereby producing waveform A of line IV. More specifically, the leftmost mark pulse P' of line III shows a detected mark starting simultaneously with a first clock pulse in line I, continuing through a second clock, and stopping just before the third clock pulse. Line IV thus changes state (to high) on the initial clock and continues until the next clock pulse after the signal level changes back (to zero). The second detected pulse P" of line III comes after a first clock pulse and stops before a third pulse. In line IV, this situation is shown as a pulse lasting between the second and third clocks. Lines V, VI and VII show different delays or shift of the pulses of line IV. Lines VIII, IX and X correspond to selectively gated pulse combinations. Line XI represents data derived from combining the various shift pulses according to the expression $\overline{BD} \cdot \overline{AC}$, assuring that only mark signals within specified duration limits are detected as data. The output of line XI is shown in FIG. 1 as the output from data buffer 20. Also fed data buffer 20 is an inhibit pulse which is inverted and is interposed in time between the signals of X and XI and is illustrated in line XII. In addition, data buffer 20 provides a counter preset pulse (line XIII) to sync counter 22 to restart the counting from which the clock is derived. As stated above, the freerunning clock in the sync counter 22 is preset whenever a mark is indicated or outputted from AND gate 19. The output from sync counter 22 which is shown in FIG. 2 as line XIV is ANDed with the inhibit pulse (XII) from data buffer 20 in the inhibit gate 24 to produce the desired derived clock output shown on line XV.

In actual practice, the derived data of line XI is delayed to coincide with the derived clock of line XV. The data then may be fed to processing circuitry (not shown) which is clocked by the derivative clock.

Obviously many modifications and variations of the present invention are possible in the light of the above teachings. It is therefore to be understood that within the scope of the appended claims the invention may be practiced otherwise than as specifically described.

We claim:

1. Self-synchronized apparatus for recognizing identifying codes comprising:
   first circuit means for receiving video input signals and providing an output of validly time digital signals,
   second circuit means coupled to said first circuit means for providing output data signals in response to a predetermined sequence of said digital signals, said second circuit means including a decode register which defines a valid mark as K high bits followed by K low bits where 2K is the capacity of said decode register, and providing an output of K high bits followed by K low bits, said second circuit means further including a constant width decoder coupled to said decode register for comparing the first K bits in a sequential, pairwise fashion with the inverse of the values of said second K bits, and
   third circuit means coupled to said second circuit means for providing a derivative clock output in response to and synchronized with said outputs data signals.

2. The apparatus of claim 1 wherein said constant width decoder includes AND gate circuit means for providing an output gate signal in response to the pairwise comparison outputs to insure that K high bits are followed by K low bits.

3. The apparatus of claim 2 wherein said third circuit means includes a buffer register for receiving the output signals from said AND gate circuit means.

4. The apparatus of claim 3 wherein said third circuit means further includes a sync counter having an input from a free running oscillator for providing an output pulse for a predetermined number of oscillator pulses received and being reset to zero upon said buffer register receiving an output signal from said AND gate circuit means.

5. The apparatus of claim 4 further including an inhibit gate connected to the output of said sync counter and to said buffer register to prevent clocking from said sync counter while data signals are being entered into said buffer register.

6. The apparatus of claim 1 further comprising a free running oscillator for clocking the video signals being received from said first circuit means.

7. The apparatus of claim 6 wherein said third circuit means includes a buffer register for receiving the output data signals from said second circuit means.

8. The apparatus of claim 7 wherein said third circuit means further includes a sync counter having an input from said free running oscillator for providing an output pulse for a predetermined number of oscillator pulses received and being reset to zero upon said buffer register receiving an output data signal from said second circuit means.

* * * * *